(12) United States Patent
Carlson et al.

(10) Patent No.: US 9,024,227 B2
(45) Date of Patent: May 5, 2015

(54) HEAT PIPE WATERLESS RESISTANCE WELDING ELECTRODE

(75) Inventors: Blair E. Carlson, Ann Arbor, MI (US); Pei-Chung Wang, Shanghai (CN)

(73) Assignee: GM Global Technology Operations LLC, Detroit, MI (US)

(*) Notice: Subject to any disclaimer, the term of this patent is extended or adjusted under 35 U.S.C. 154(b) by 691 days.

(21) Appl. No.: 13/227,511

(22) Filed: Sep. 8, 2011

(65) Prior Publication Data

US 2013/0062319 A1 Mar. 14, 2013

(51) Int. Cl.
*B23K 9/24* (2006.01)
*B23K 11/30* (2006.01)
*B23K 35/00* (2006.01)
*B23K 35/02* (2006.01)
*C22C 19/00* (2006.01)

(52) U.S. Cl.
CPC ........... *B23K 11/3018* (2013.01); *B23K 35/002* (2013.01); *B23K 35/0261* (2013.01); *C22C 19/00* (2013.01); *B23K 11/3054* (2013.01)

(58) Field of Classification Search
USPC ............ 219/86.51, 86.41, 117.1, 78.01, 119, 219/120
See application file for complete search history.

(56) References Cited

U.S. PATENT DOCUMENTS

| | | | |
|---|---|---|---|
| 6,573,470 B1 * | 6/2003 | Brown et al. | ............... 219/86.51 |
| 7,238,911 B2 | 7/2007 | Stevenson et al. | |
| 7,265,313 B2 | 9/2007 | Stevenson et al. | |

FOREIGN PATENT DOCUMENTS

| | | | | |
|---|---|---|---|---|
| DE | 4008252 A1 | 9/1991 | | |
| DE | 4243213 C1 | 12/1992 | | |
| JP | 06117900 A | * 4/1994 | ................ | G01F 1/68 |
| JP | 06147379 A | * 5/1994 | ............. | F16L 37/00 |

* cited by examiner

*Primary Examiner* — Henry Yuen
*Assistant Examiner* — Ayub Maye

(57) ABSTRACT

An apparatus for resistance welding with a welder includes a heat pipe including a hollow tube and a weld electrode fitted around a portion of the heat pipe. The weld electrode and heat pipe are conductively coupled to conduct heat across an inner surface of the weld electrode.

15 Claims, 4 Drawing Sheets

HEAT PIPE WATERLESS RESISTANCE WELDING ELECTRODE

TECHNICAL FIELD

This disclosure is related to resistance welding.

BACKGROUND

The statements in this section merely provide background information related to the present disclosure. Accordingly, such statements are not intended to constitute an admission of prior art.

Resistance welding is a known process whereby electrical current is passed between two electrodes. Work pieces to be joined, usually made of metallic pieces, are placed between the electrodes, a clamping force is applied to the electrodes, and current flowing between the electrodes passes through the work pieces. The electrical resistance in and between the work pieces, when exposed to the current, creates sufficient heat to locally melt the work pieces. The molten portions of the work pieces are allowed to cool, creating a welded joint between the work pieces.

Spot welding is a known type of resistance welding. It frequently involves two substantially circular copper electrodes that come close to each other, leaving a gap for work pieces to be inserted therebetween. As current is applied, and the circular electrodes create a circular weld pattern to the work pieces. Common techniques utilize a series of spot welds to join pieces along a flange as well as body structure.

SUMMARY

An apparatus for resistance welding with a welder includes a heat pipe including a hollow tube and a weld electrode fitted around a portion of the heat pipe. The weld electrode and heat pipe are conductively coupled to conduct heat across an inner surface of the weld electrode.

BRIEF DESCRIPTION OF THE DRAWINGS

One or more embodiments will now be described, by way of example, with reference to the accompanying drawings, in which.

DETAILED DESCRIPTION

Figure 1:
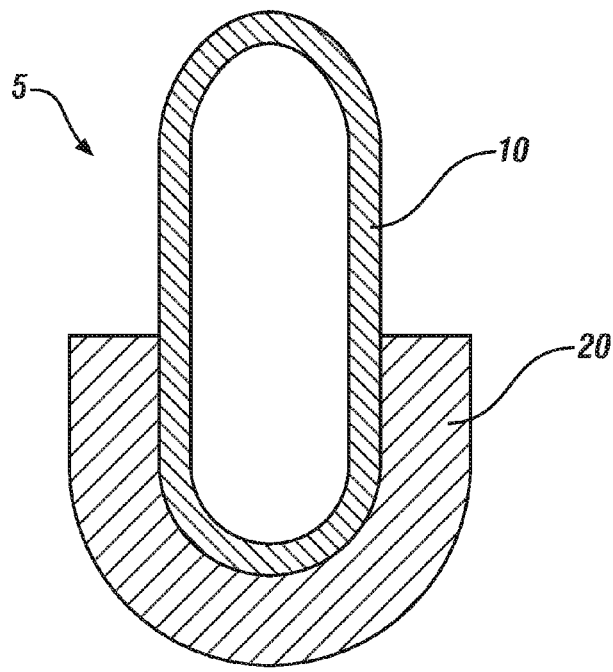
FIG. 1 illustrates an exemplary female-type weld electrode and a connecting heat pipe, in accordance with the present disclosure.

Referring now to the drawings, wherein the showings are for the purpose of illustrating certain exemplary embodiments only and not for the purpose of limiting the same, resistance welding places two electrodes on either side of a work piece, electrical current is applied to the electrodes, and the high current passing between the electrodes causes the work piece to melt locally. Substantial joule heat is created in this process, and the electrodes must be kept within an operating temperature range to avoid excess temperatures damaging the electrodes. In particular, as thinner gauge work pieces are used in the object being manufactured, the electrodes are increasingly exposed to higher temperatures proximate to the molten material being induced in the region being welded between the work pieces. High temperature on the electrodes in excess of the operating temperature range can degrade the electrodes and consequently affect the weld quality. Degradation of the electrode can include flattening out of the electrode at the point of contact with the work pieces, resulting in a loss of current density and a resulting decrease in the welding efficiency of the welding device.

The electrode can be cooled by cooling water inside the shank at room temperatures. Coolants can be channeled through a heat pipe coupled to each of the electrodes. Heat can be transferred from the electrodes to the coolant, facilitating keeping the temperature of the electrodes within the operating temperature range while reducing cycle times for example, reducing time spent to replace or tip dress the electrode. Although cooling water is effective to cool down the electrode, it requires a pipe, pump and maintenance, and consequently results in high production cost. Therefore, there is a need to eliminate cooling by water or other liquid in resistance welding. In manufacturing environments, additionally providing a water line to the welding equipment can be expensive or not feasible.

Heat pipes remove heat from a device primarily by conduction. An embodiment of a heat pipe includes a hollow structure made of heat conductive material. Efficiency of the heat pipe in cooling the device depends upon the heat pipe including as much solid contact with the device being cooled as possible. If a portion of the area where the heat pipe and the device being cooled are supposed to be in contact is not in contact, the efficiency of the heat pipe in cooling the device can be reduced.

A heat pipe can be used to cool a weld electrode or electrodes of a welding device. FIG. 1 illustrates an exemplary weld electrode and a connecting heat pipe. Configuration 5 includes a heat pipe 10 and a weld electrode 20. Weld electrode 20 is fitted around a portion of heat pipe 10. By conductively connecting an inner surface of weld electrode 20 and heat pipe 10, heat can be removed from the weld electrode 20 primarily by conduction. During operation of the welding device, current is passed through weld electrode 20 into a connecting work piece. At a point of high resistance, typically at a faying interface between the first work piece and a second work piece, the joule heat resulting from the weld current melts the work pieces, and the surrounding molten material becomes the resulting weld. Heat from this welding process is conducted through the work piece to the electrode and increases the temperature of the electrode 20. Heat can be removed from electrode 20 by conduction through heat pipe 10.

A heat pipe can be used to cool a weld electrode on a welding device. The heat pipe can be inserted within the electrode. The efficiency of the heat pipe in cooling the electrode is directly related to the area of contact between the heat pipe and the electrode. By conductively connecting a weld electrode and a heat pipe across a substantial entirety of an area of contact between the electrode and the heat pipe, heat conduction between the two can be maximized. A heat pipe is a device known in the art and will not be disclosed in detail herein. In one exemplary embodiment, a heat pipe includes a liquid within the hollow portion of the heat pipe. The liquid is exposed to the portion of the heat pipe near the device being cooled, and as the liquid heats and changes state to a gas, heat is removed from the device being cooled. The gas travels through the heat pipe to a cooling device, such as a device utilizing a fan and/or cooling fins exposed to ambient air. As the gas cools back into a liquid, heat is expelled through the cooling device, and the liquid can return to again cool the device being cooled. A number of factors can act to reduce the area of contact between the heat pipe and the electrode thereby reducing the conduction of heat between the parts. Manufacturing tolerances for both the heat pipe and the electrode can reduce the area of contact. Either the heat pipe or the electrode can become deformed through the life of the welder by the cycling of temperatures, forces applied through the contact with the work pieces, or normal wear in the manufacturing environment. To minimize these potential effects, a conductive intermediate piece can be inserted between the heat pipe and the electrode to facilitate heat conduction between the heat pipe and the electrode. The efficiency of the heat pipe in cooling the electrode is directly related to the area of contact between the heat pipe and the intermediate piece and also the area of contact between the intermediate piece and the electrode. However, the area of contact between the intermediate piece and the heat pipe and the electrode is still subject to manufacturing tolerances and can change over time.

Shape memory materials (SMM) such as shape memory alloys or shape memory polymers enable creation of a piece that changes shape based upon the temperature of the piece. Shape memory materials can include a number of compositions. Shape memory materials can change shape in one direction to a trained shape based upon heating, or shape memory materials can change between a first trained shape in a hot temperature and a second trained shape in a cool temperature. Shape memory materials are well known in the art and will not be disclosed in detail herein.

A piece made from a shape memory material can be used as an interface between a heat pipe and an electrode, facilitating heat transfer away from the electrode without the use of water cooling by reducing or eliminating a gap between the parts. The intermediate piece constructed of a shape memory material can be trained to a shape calibrated to improve conductivity between the parts. The trained shape can selected to span a gap between the intermediate piece and the weld electrode and/or facilitate the weld electrode being fitted fully upon the heat pipe. By flexing in this way, the shape memory material (SMM) intermediate piece can reduce or fill any gap that exists or forms between the heat pipe, the electrode, and the SMM intermediate piece.

Figure 2:
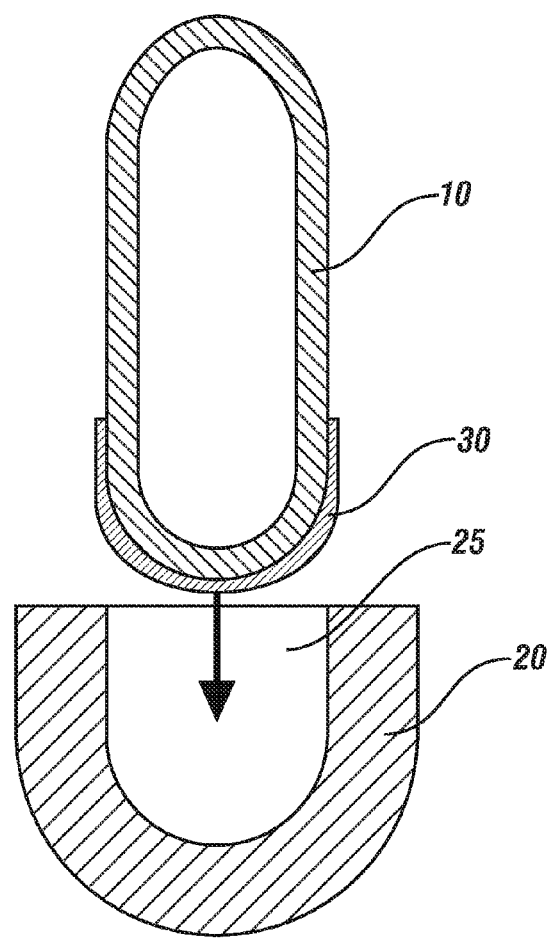
FIG. 2 illustrates an exemplary heat pipe, electrode, and SMM intermediate piece prior to assembly, in accordance with the present disclosure.

FIG. 2 illustrates an exemplary heat pipe, electrode, and SMM intermediate piece prior to assembly. Heat pipe 10 includes SMM intermediate piece 30 fitted thereupon. Electrode 20 includes a cavity 25 sized to accept heat pipe 10 and SMM intermediate piece 30. Cavity 25 can be sized to include a slight interference fit, a nominal fit, or a slight loose fit when heat pipe 10 and SMM intermediate piece 30 are inserted. When heat pipe 10 and SMM intermediate piece 30 are inserted within cavity 25, the heat pipe 10 and SMM intermediate piece 30 are in direct contact with each other, and the electrode 20 and SMM intermediate piece 30 are in direct contact with each other. SMM intermediate piece 30 can be made of an electrically and thermally conductive material, such that current can be passed through the piece and heat can be conducted from the electrode into the heat pipe.

Figure 3:
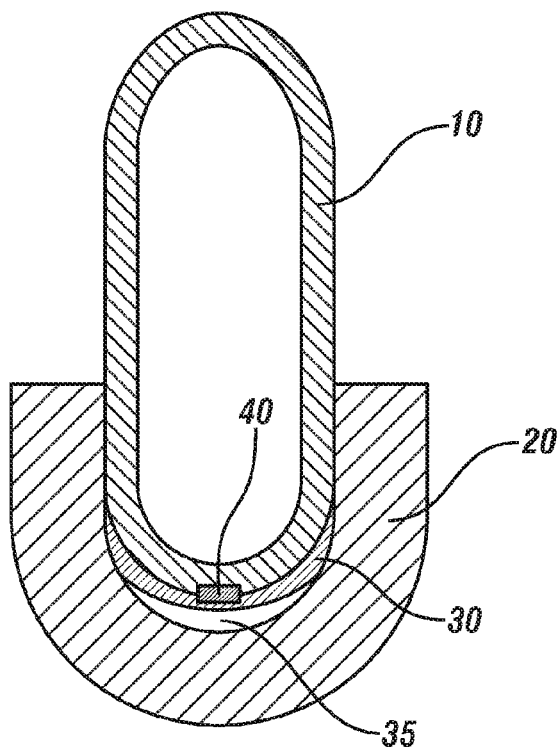
FIG. 3 illustrates an exemplary heat pipe, electrode, and SMM intermediate piece including a plurality of gaps between the parts, in accordance with the present disclosure.

FIG. 3 illustrates an exemplary heat pipe, electrode, and SMM intermediate piece including a plurality of gaps between the parts. Heat pipe 10 and SMM intermediate piece 30 have been inserted into electrode 20. If no gaps existed between the parts, then each of the parts would include an area of contact with an adjoining part along an entire interface between the parts, resulting in an ideal thermal conductivity between the parts. Either immediately or as a result of factors causing gaps between the parts over time, gap 35 is present. As a result, an area of contact between electrode 20 and SMM intermediate piece 30 is reduced by gap 35. As a result, thermal conductivity from electrode 20 to heat pipe 10 through SMM intermediate piece 30 is reduced from the ideal thermal conductivity that would exist if no gap was present. FIG. 3 illustrates an embodiment wherein a sensor 40 can be utilized to estimate whether the SMM intermediate piece 30 is transitioned to a trained shape.

Figure 4:
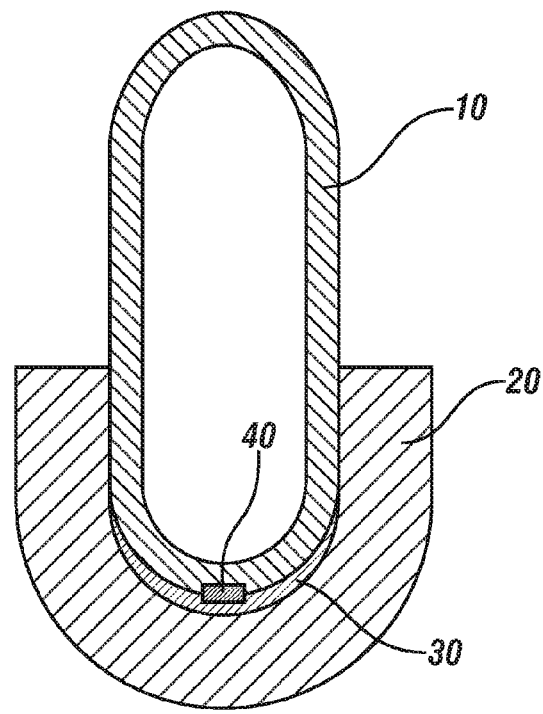
FIG. 4 illustrates the heat pipe, electrode, and SMM intermediate piece of FIG. 3 wherein the SMM intermediate piece has been heated to a transition temperature and the trained shape of the SMM intermediate piece has created direct contact between the parts, eliminating the gap between the parts, in accordance with the present disclosure.

FIG. 4 illustrates the heat pipe, electrode, and SMM intermediate piece of FIG. 3 wherein the SMM intermediate piece has been heated to a transition temperature and the trained shape of the SMM intermediate piece has created direct contact between the parts, eliminating the gap between the parts. Heat pipe 10, SMM intermediate piece 30, and electrode 20 are in direct contact, such that an area of contact between the parts is maximized, and a corresponding maximum amount of heat transfer can take place between heat pipe 10, SMM intermediate piece 30, and electrode 20.

When heated to a transition temperature, the SMM intermediate piece can reduce or eliminate gaps. Through normal operation of the welder, the temperature of the electrode would increase and cause the SMM to transition to its trained shape. However, operation of the welder in a time period prior to the SMM intermediate piece reaching the temperature it needs to transition or transition temperature can be adversely affected during the time when the SMM intermediate piece is not at temperature and any gaps between the parts exist. As a result, it can be beneficial to precondition the welder based upon welder inactivity or insufficient activity in a prior time period and bring the temperature of the SMM intermediate piece up such that the SMM transitions to the trained shape and any gaps between the parts are reduced or eliminated before the welder is operated. Inactivity of the welder in the prior time period can be monitored through methods such as recording cycling operation of the welder or by monitoring current flow through the electrodes. A number of methods are envisioned to precondition the welder. Current can be passed between the electrodes, causing the electrodes to heat and thereby elevating the temperature of the SMM intermediate piece. In another embodiment, an external thermoelectric heating device can be located proximately to the electrode, heat pipe, or SMM intermediate device, and heat can be transferred to the SMM intermediate piece.

Behavior of the SMM intermediate piece in the welder can be estimated or modeled based upon calibrating a representative configuration equipped with a sensor or sensors. For example, a force sensor placed at or near boundary of a tip of the electrode, for example, in the underside of the electrode at the surface where it couples with the SMM intermediate piece, and the SMM intermediate piece can monitor the application of force at the boundary and diagnose whether the electrode and the SMM intermediate piece are in contact based upon the force applied. If the SMM intermediate piece and the weld electrode are in direct contact, then clamping force applied to the electrode by the welder as part of the welding process will result in a compressive force between the weld electrode and the SMM intermediate piece. If the SMM intermediate piece and the weld electrode are in only light or spotty contact, then a smaller clamping force of the welder will result in a smaller compressive force between the weld electrode and the SMM intermediate piece. If a gap completely separates the tip of weld electrode and the SMM intermediate piece, then clamping force applied to the electrode by the welder will not result in compressive force In this way, a gap or incomplete contact between the SMM intermediate piece and the electrode in the area between the tip of the electrode and the SMM intermediate piece can be diagnosed. Operation of the welder can be achieved by requiring that the monitored force meet a threshold force during the welding process, and if the threshold is not achieved, then more heat must be applied to the SMM intermediate piece or the welder needs to be preconditioned to bring the SMM intermediate piece to the transition temperature. The threshold force can be selected by calibration, modeling or any method sufficient to accurately predict operation of the welder including the SMM intermediate piece.

In another embodiment, a temperature sensor can be located close to the SMM intermediate piece, and behavior of the SMM intermediate piece can be estimated based upon comparing a monitored or estimated temperature of the SMM intermediate piece to the transition temperature for the piece. A minimum desired temperature or threshold temperature can be selected for the SMM intermediate piece based upon calibration, modeling or any method sufficient to estimate operation of the welder and the transition of SMM intermediate piece. The threshold temperature can be the transition temperature for the SMM intermediate piece or some value selected above the transition temperature. The threshold temperature can be selected by calibration, modeling or any method sufficient to accurately predict operation of the welder including the SMM intermediate piece.

Based upon calibration or predictions of behavior of the SMM intermediate piece, an operation profile for the welder can be developed. The operation profile could account for the welder being operated a certain number of times per minute to maintain a minimum desired temperature or an interruption of a certain number of minutes to the operation of the welder requires the welder to be preconditioned or other remedial action to be taken such as increasing a dwell time of the electrode upon the heater work pieces to increase the temperature of the SMM intermediate piece.

Figure 5:
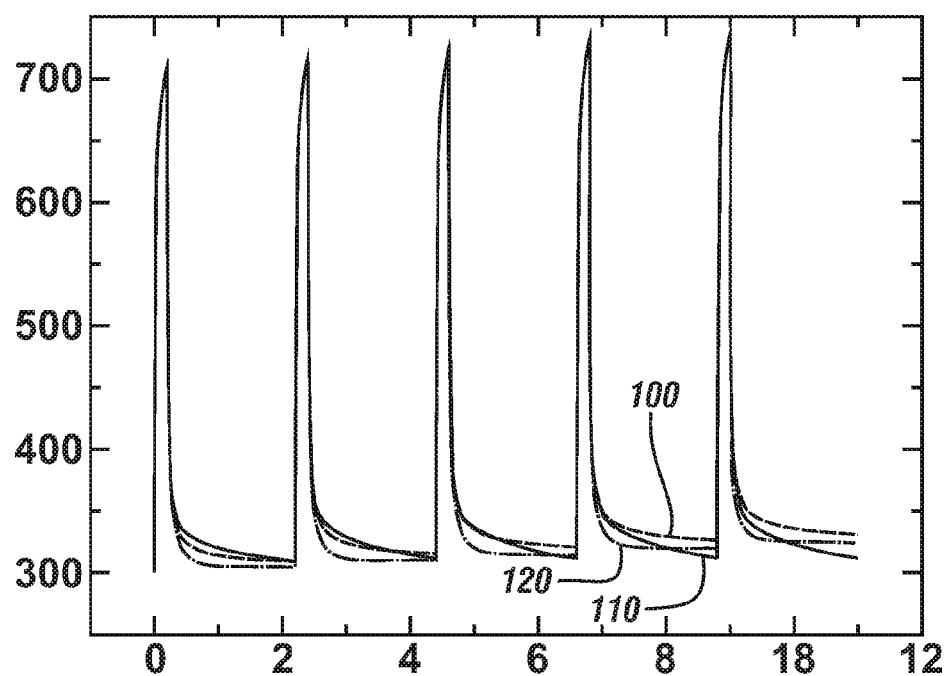
FIG. 5 illustrates exemplary data from three cooling methods, including an electrode coupled to a solid copper rod, an electrode coupled to a rod equipped with a water cooling circuit, and an electrode coupled to a heat pipe, in accordance with the present disclosure.

FIG. 5 illustrates exemplary data from three cooling methods, including an electrode coupled to a solid copper shank, an electrode coupled to a shank equipped with a water cooling circuit, and an electrode coupled to a heat pipe. The horizontal x-axis illustrates the weld time in seconds. The vertical y-axis illustrates temperature at the underside of the electrode in degrees Kelvin. Plots representing modeled results from three cooling methods, including a plot 100 representing an electrode coupled to a solid copper shank, a plot 110 representing an electrode coupled to a shank equipped with a water cooling circuit, and a plot 120 representing an electrode coupled to a heat pipe, are illustrated. Each maximum peak in the temperature represents a weld being performed. After the weld is performed, the temperature of each of the plots returns quickly to a lower value. The welder utilizing the electrode coupled to a solid shank shows an increase in the lower value through the depicted time span, illustrating the heat build-up in the welder with the solid copper shank. Over time, the temperature of this welder can exceed the operating temperature range for the electrode and cause damage to the electrode. The welder utilizing the shank equipped with the water cooling circuit shows substantially steady results in the lower value through the depicted time span, illustrating temperature control in the welder with the water cooling circuit. Similarly, the welder utilizing the shank equipped with the heat pipe shows substantially steady results in the lower value through the depicted time span, illustrating temperature control in the welder with the heat pipe.

Figure 6:
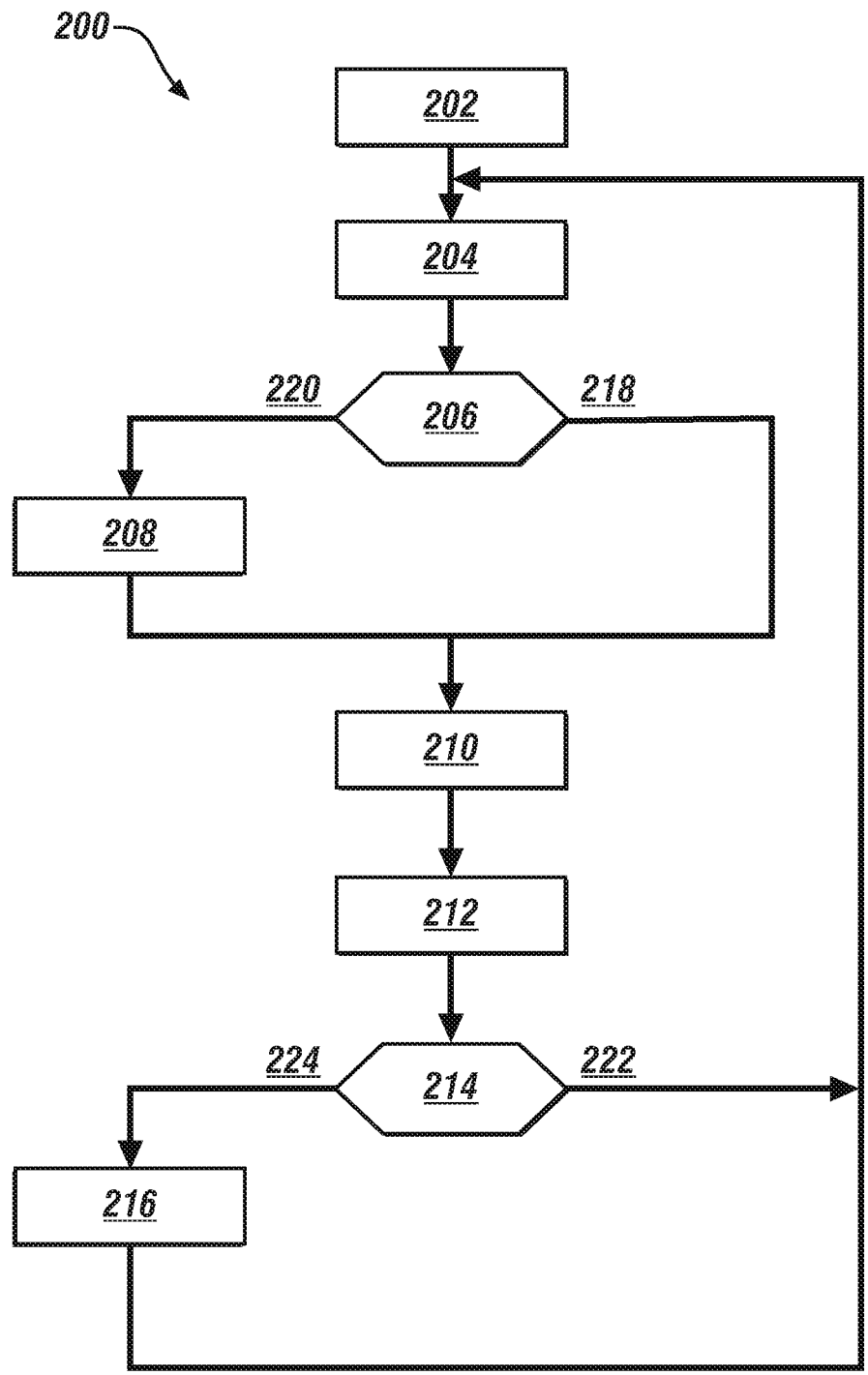
FIG. 6 illustrates an exemplary process to operate a welder including an SMM intermediate piece conductively connecting a heat pipe and a weld electrode, in accordance with the present disclosure.

FIG. 6 illustrates an exemplary process to operate a welder including an SMM intermediate piece conductively connecting a heat pipe and a weld electrode. Table 1 is provided as a key to FIG. 6 wherein the numerically labeled blocks and the corresponding functions are set forth as follows.

TABLE 1

| BLOCK | DESCRIPTION |
| --- | --- |
| 202 | Begin |
| 204 | Monitor Operation of the Welder Through a Prior Time Period |
| 206 | Does the Monitored Operation Require Preconditioning of the Welder |
| 208 | Precondition Welder |
| 210 | Operate Welder |
| 212 | Monitor Sensor Within the Welder |
| 214 | Does the Sensor Signal Indicate that the SMM Intermediate Piece Is Transitioned to the Trained Shape |
| 216 | Precondition Welder |

Process 200 begins at block 202. At block 204, operation of the welder is monitored through a prior time period to evaluate the condition of the SMM intermediate piece within the welder. At block 206, the process determines whether the monitored operation through the prior time period indicates that preconditioning of the welder is required to bring the SMM intermediate piece to a minimum desired temperature. If block 206 is answered as no, path 218 is followed to block 210. If block 206 is answered yes, path 220 is taken to block 208 wherein the welder is preconditioned. In block 210, welder is operated. In block 212, a sensor within the welder is monitored. At block 214, the process determines whether the SMM intermediate piece is transitioned properly to the trained state. If block 214 is answered as yes, then the process returns to block 204 by path 222. If block 214 is answered as no, then path 224 is taken and the welder is preconditioned at block 216 before returning to block 204. This process is an example of how the apparatus and method described herein can be operated, and the disclosure is not intended to be limited to the particular exemplary embodiments provided herein.

A welder can include two electrodes located on either side of a work piece to be welded. The apparatus and method disclosed herein can be used on one or both of the electrodes of the welder.

The SMM intermediate piece transitions to a trained shape at the transition temperature. The trained shape is selected to span any gap between the SMM intermediate piece and the weld electrode and/or facilitate the weld electrode being fitted fully upon the heat pipe. One having skill in the art will appreciate that SMM pieces have limits based upon material properties and piece configurations known in the art, and the SMM intermediate piece must be selected to fill gaps based upon these limits.

Figure 7:
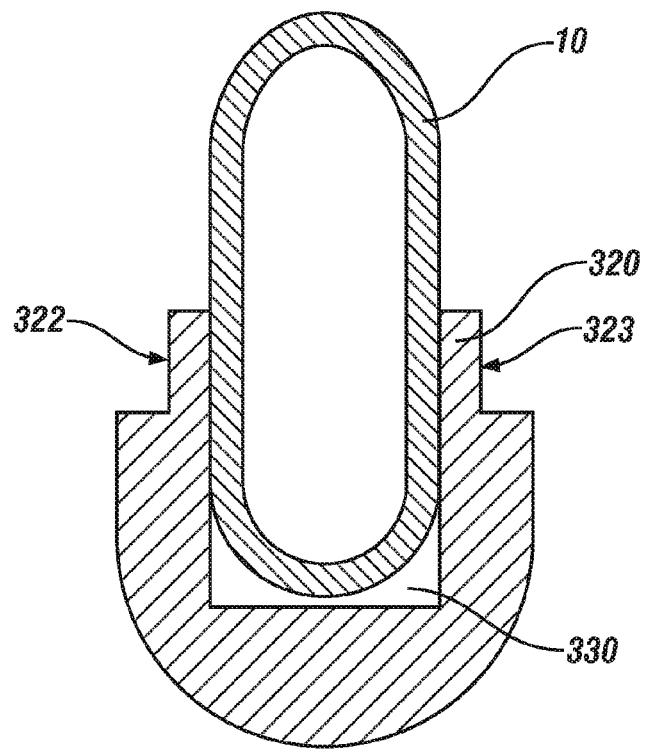
FIG. 7 illustrates an exemplary configuration including a male-type weld electrode and an SMM intermediate piece, in accordance with the present disclosure.

The configurations and methods described herein can be utilized in a variety of welder and electrode arrangements. The weld electrodes of FIGS. 1-4 can be described as a female-type weld electrode. FIG. 7 illustrates an exemplary configuration including a male-type weld electrode and an SMM intermediate piece. Heat pipe 10 and SMM intermediate piece 330 have been inserted into electrode 320. Electrode 320 includes tapered electrode end 322 and 323, wherein the electrode can be inserted into a shank of the welder, for example, including a fixture for applying clamping pressure on the work piece through the electrode 320 and/or a conductive path for the current applied by welder to reach the electrode. SMM intermediate piece 330 is similar to SMM intermediate piece 30 with different features to match the internal shape of electrode 320. Further, SMM intermediate piece 330 includes a trained shape selected or calibrated to eliminate gaps specifically likely to occur in electrode 320. At or proximate to the interface of SMM intermediate piece 330 and electrode, a sensor can be utilized to determine whether the SMM intermediate piece 330 is transitioned as disclosed herein.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Resistance welding can be operated according to a number of embodiments, including resistance spot welding, resistance project welding, resistance seam welding, and other forms of welding known in the art, and the apparatus and methods disclosed herein can be used with any of these embodiments.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Apparatus for resistance welding with a welder, comprising:
    a heat pipe comprising a hollow tube used to cool a weld electrode;
    the weld electrode fitted around a portion of the heat pipe;
    a shape memory material intermediate piece located between the heat pipe and the weld electrode;
    wherein the shape memory material intermediate piece conductively couples the weld electrode and heat pipe to conduct heat across an inner surface of the weld electrode.

2. The apparatus of claim 1, wherein the weld electrode and heat pipe are conductively coupled across a substantial entirety of said portion of the heat pipe.

3. The apparatus of claim 1, wherein the shape memory material intermediate piece transitions to a trained shape when heated to a transition temperature.

4. The apparatus of claim 1, wherein the welder is preconditioned to heat the shape memory material intermediate piece based upon welder inactivity through a prior time period.

5. The apparatus of claim 1, wherein the shape memory material intermediate piece is electrically conductive; and
    wherein the welder passes electric current through the shape memory material intermediate piece.

6. The apparatus of claim 1, wherein the heat pipe comprises a first heat pipe;
    wherein the weld electrode comprises a first weld electrode; and
    further comprising a second weld electrode coupled to a second heat pipe, wherein the first weld electrode and the second weld electrode cooperatively perform a resistance weld.

7. The apparatus of claim 1, wherein the weld electrode is utilized for resistance spot welding.

8. The apparatus of claim 3, wherein the trained shape reduces a gap between the weld electrode and the shape memory material intermediate piece.

9. The apparatus of claim 3, wherein the trained shape is selected to improve conductive contact between the weld electrode and the shape memory material intermediate piece.

10. The apparatus of claim 3, further comprising a sensor located proximately to the shape memory material intermediate piece to monitor the shape memory material intermediate piece transitioning to the trained shape.

11. The apparatus of claim 10, wherein the sensor comprises a force sensor monitoring a force exerted between the shape memory material intermediate piece and a tip of the weld electrode; and
    wherein monitoring the shape memory material intermediate piece transitioning to the trained shape comprises comparing the force exerted between the shape memory material intermediate piece and the tip of the weld electrode to a predetermined force.

12. The apparatus of claim 10, wherein the sensor comprises a temperature sensor located to monitor a temperature of the shape memory material intermediate piece; and
    wherein monitoring the shape memory material intermediate piece transitioning to the trained shape comprises comparing the monitored temperature to a predetermined temperature.

13. The apparatus of claim 10, wherein the welder is operated to precondition the shape memory material intermediate piece based upon an output of the sensor.

14. The apparatus of claim 10, wherein an external heating device is operated to precondition the shape memory material intermediate piece based upon an output of the sensor.

15. Apparatus for resistance welding, comprising:
    a heat pipe comprising a hollow tube used to cool a weld electrode;
    the weld electrode fitted around a portion of the heat pipe; and
    a shape memory material intermediate piece located between the heat pipe and the weld electrode;

a sensor located proximately to the shape memory material intermediate piece;

wherein the shape memory material intermediate piece conductively couples the heat pipe to the weld electrode;

wherein the shape memory material intermediate piece is configured to transition to a trained shape selected to reduce a gap between the weld electrode and the shape memory material intermediate piece when the shape memory material intermediate piece is heated to a transition temperature;

wherein the sensor monitors the shape memory material intermediate piece transitioning to the trained shape.

\* \* \* \* \*